United States Patent Office 3,147,818
Patented Sept. 8, 1964

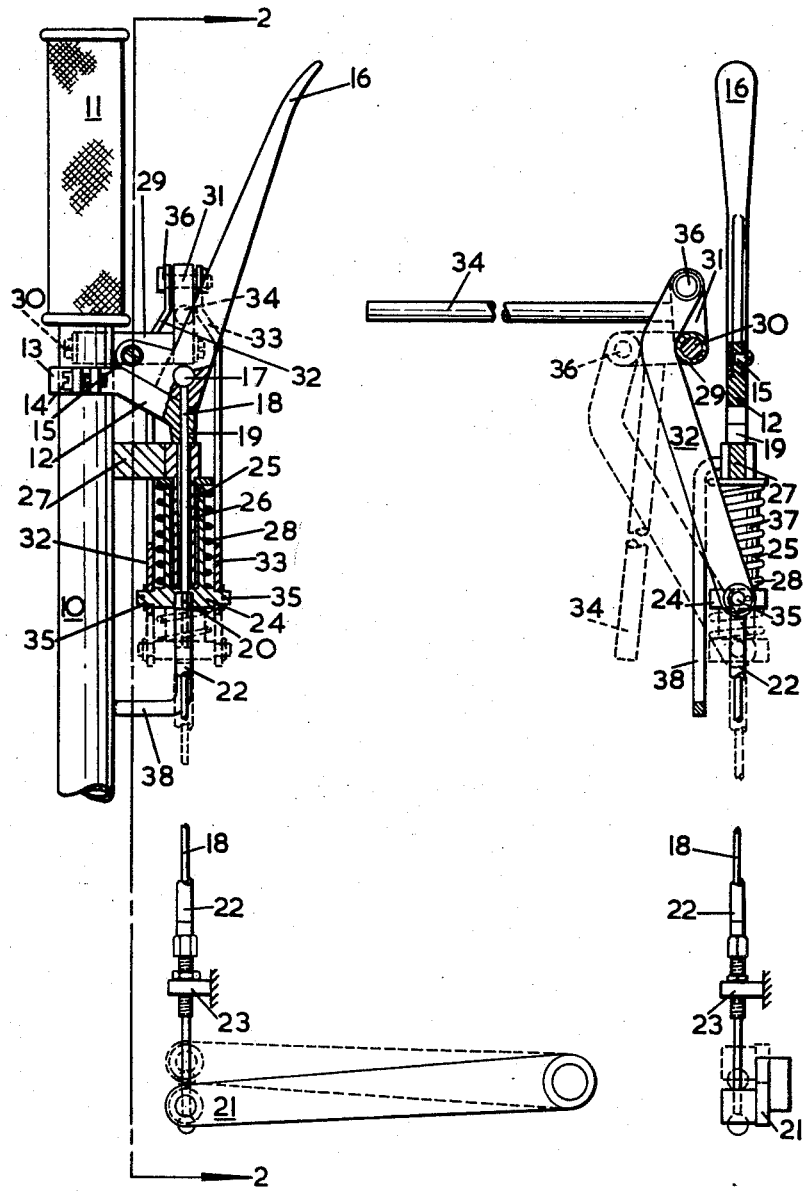

3,147,818
REVERSE-DRIVE SAFETY DEVICE FOR A WALK-TYPE TRACTOR OR CULTIVATOR
Arthur Clifford Howard and John Arthur Howard, West Horndon, England, assignors to Rotary Hoes Limited, West Horndon, England
Filed May 27, 1963, Ser. No. 283,416
Claims priority, application Great Britain June 8, 1962
6 Claims. (Cl. 180—82)

The invention relates to a power-operated, walk-type tractor or cultivator of the kind provided with ground-engaging wheels which can be driven, through a clutch and a gear box, in either direction so as to provide both forward and rearward travel. The term "cultivator" is used generically hereinafter to cover both walk-type tractors and cultivators. When such a cultivator is being driven in reverse there is a risk that the operator might back into an obstacle which would arrest his rearward progress and cause the cultivator to overrun, or otherwise injure him. The object of the invention is to provide a safety device for reducing that risk.

According to the invention a power-operated walk-type cultivator, of the kind set forth, has its clutch provided with a control including a safety member which extends in front of the operator so that, when the cultivator is being driven in reverse and tends to overtake the operator, the latter will encounter the safety member which will operate the clutch to its disengaged condition.

According to a feature, and in the case where the clutch is withdrawable by a cable connected to an operating member and extending through a tubular sheath having its ends anchored, the anchorage for the end of the sheath adjacent the operating member can be held, against a bias, in its operative position by the safety member, and operation of the safety member liberates the said adjacent anchorage for its bias to withdraw the clutch suddenly.

In such a case the safety member can be fast with a pivoted arm of which one end is connected by a link to the said adjacent anchorage and the other end is pivoted to stationary structure, the safety member, when in its operative position, holding the link pivots over-set relatively to the pivot of the said pivoted arm whereby to prevent movement of the said adjacent anchorage by said bias until said safety member has been operated to move the link into a position in which the link pivots are not over-set.

In instances where the cultivator is provided with a pair of handlebars for the walking operator, the clutch control is preferably mounted from one of the handlebars, the said other end of the pivoted arm is pivoted from the said one handlebar, and the safety member, when in its said operative position, extends laterally between the handlebars and is adapted to be moved horizontally forwards, on encountering the operator, to disengage the clutch.

One embodiment of the invention, as applied to a walk-type cultivator of the kind set forth and having a pair of handlebars for the operator, is shown diagrammatically in the accompanying drawings, in which:

FIGURE 1 is a side elevation, partly in section, of the outer end of one handlebar and the clutch controls;

FIGURE 2 is a sectional plan on the line 2—2 of FIGURE 1, and

Figure 3:
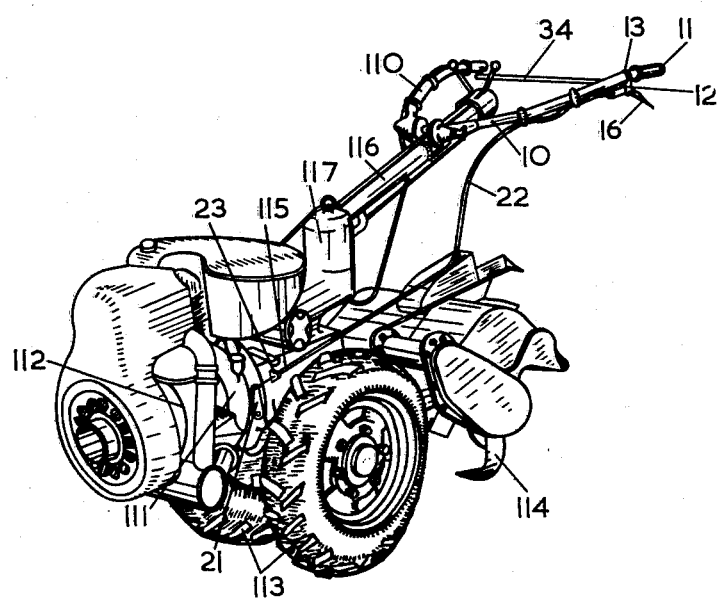
FIGURE 3 is a perspective front view of a power-operated walk-type cultivator provided with the handlebar and controls shown in FIGURES 1 and 2.

In FIGURE 1 the left handlebar is indicated at 10, with a rubber hand-grip for the operator at 11. A bracket 12 having its upper end formed as half of a split clamp is held firmly to the handlebar by the other half 13 of the clamp and screws 14, and the bracket has pivoted to it at 15 a normal operating lever 16 for the clutch. This lever provides at 17 an anchorage for one end of a cable 18 which extends through a boss 19 of bracket 12, through a ferrule 20, and is connected to the outer end of a clutch withdrawal lever 21. The cable 18 is accommodated in the bore of a tubular sheath 22 which has its end adjacent lever 21 anchored to stationary structure 23, and the other end of the sheath engages the ferrule 20 which abuts the bottom of a recess in a movable anchorage 24. The latter has a tubular extension 25 fitting telescopically over a tubular guide 26 for the cable 18, and the guide 26 is held in a block 27 fast with the handlebar. Unless the safety arrangement provided by the invention has been actuated to its operative, or "cocked" position, as hereinafter described, a spring 28 biases the movable anchorage 24 into the dotted line position shown, in which the sheath is fed relatively to the cable for moving the lever 21 into the dotted line position in which the clutch is disengaged irrespective of the position of the normal clutch operating lever 16.

For providing the safety feature of the invention the handlebar supports a bearing barrel 29 in which is journalled a stub shaft 30 having a radial arm 31 at its foot, and the outer end of this arm is connected to the movable anchorage 24 by upper and lower links 32, 33 respectively. The safety member is in the form of a bar 34 extending laterally from arm 31.

Before the clutch can engage, bar 34 has to be moved to the full line position in which it lies athwart, and in front of the operator as shown in FIGURE 3. This moves movable anchorage 24 to its full line position in which spring 28 is compressed, and the said anchorage is held in that position by the over-setting of the link pivots 35, 36 with respect to stub shaft 30, the links 32 and 33 being suitably bent to permit the over-setting, and the link 32 being arranged to abut the bearing barrel 29 to maintain the over-set position.

If the cultivator is driven in reverse and the operator's rearward progress is obstructed by, say, a tree which brings him to a standstill, the further rearward progress of the cultivator will cause bar 34 to encounter the operator. This will move bar 34 forwardly about its pivot 30 and, after it will have moved only a very short distance in this manner, link pivot 36 will move out of the over-set position and will allow spring 28 to move movable anchorage 24 suddenly to the dotted line position to disengage the clutch.

The tubular extension 25 and the tubular guide 26 are conveniently provided with respective longitudinal slits 37, see FIGURE 2, for enabling the cable to be entered into the bore of the said guide, and a guide bar 38 interconnects the handlebar 10 and the guide 26.

FIGURE 3 shows a cultivator having a pair of handlebars 10, 110 of which the former is provided with the safety bar 34 which has been described in detail with reference to FIGURES 1 and 2, and with the normal clutch control 16 for the cultivator clutch 111 which is actuated through withdrawal lever 21 and sheathed cable 22. The cultivator comprises a prime mover 112 which is connected to drive a pair of ground-engaging wheels 113 and a rotor 114 through the clutch 111 and a change-speed gear box 115. The handlebars 11, 110 are adjustably mounted from a boom 116 which is supported rigidly from the gear box 115 by an upstanding casing portion 117.

What we claim as our invention and desire to secure Letters Patent of the United States is:

1. A power-operated, walk-type cultivator comprising a prime mover, a clutch, a gear box adapted to provide forward and reverse gear ratios, ground-engaging means for driving said cultivator, said prime mover adapted to drive said ground-engaging means through said clutch and said gear box, an operating member movable for actuating said clutch, a control supported from the rear of said cultivator, means interconnecting said operating member and said control, a safety member, means supporting said safety member from the rear of said cultivator, operating means interconnecting said safety member and said control, and said safety member adapted to be moved horizontally towards the front of said cultivator from an inoperative position in which it extends transversely of said cultivator in front of the station for the walking operator to an operative position in which said operating means acts on said control to disengage said clutch whereby, when said cultivator is driven with said reverse gear ratio engaged and tends to overtake said operator, said safety member encounters said operator and is moved horizontally forwards to its said operative position to halt said cultivator.

2. A power-operated, walk-type cultivator comprising a prime mover, a clutch, a gear box adapted to provide forward and reverse gear ratios, ground-engaging means for driving said cultivator, said prime mover adapted to drive said ground-engaging means through said clutch and said gear box, an operating member movable for actuating said clutch, a control supported from the rear of said cultivator, a cable inter-connecting said operating member and said control, a tubular sheath surrounding said cable, a first anchorage fast with said cultivator, the end of said tubular sheath adjacent said operating member held by said first anchorage, a second anchorage, means supporting said second anchorage for axial movement relatively to said cultivator, the end of said tubular sheath adjacent said control held by said second anchorage, a safety member, means supporting said safety member from the rear of said cultivator, operating means interconnecting said safety member and said second anchorage, and said safety member adapted to be moved horizontally towards the front of said cultivator from an inoperative position in which it extends transversely of said cultivator in front of the station for the walking operator to an operative position in which said operating means acts on said second anchorage to disengage said clutch whereby, when said cultivator is driven with said reverse gear ratio engaged and tends to overtake said operator, said safety member encounters said operator and is moved horizontally forwards to its said operative position to halt said cultivator.

3. A power-operated, walk-type cultivator comprising a prime mover, a clutch, a gear box adapted to provide forward and reverse gear ratios, ground-engaging means for driving said cultivator, said prime mover adapted to drive said ground-engaging means through said clutch and said gear box, an operating member movable for actuating said clutch, a control supported from the rear of said cultivator, a cable interconnecting said operating member and said control, a tubular sheath surrounding said cable, a first anchorage fast with said cultivator, the end of said tubular sheath adjacent said operating member held by said first anchorage, a second anchorage, means supporting said second anchorage for axial movement relatively to said cultivator, the end of said tubular sheath adjacent said control held by said second anchorage, a safety member, an arm, said safety member fast with said arm intermediate the ends of said arm, a first pivot arranged to support one of said ends of said arm from the rear of said cultivator, a link, a second pivot interconnecting one end of said link and the other said end of said arm, a third pivot interconnecting the other end of said link and said second anchorage, said safety member adapted to be moved from an inoperative position in which said second and third pivots are over-set relatively to said first pivot and said safety member extends transversely of said cultivator in front of the station for the walking operator to an operative position in which said second and third pivots are under-set relatively to said first pivot and said link acts on said second anchorage to disengage said clutch, and spring means arranged to bias said safety member to said operative position whereby, when said cultivator is driven with said reverse gear ratio engaged and tends to overtake said operator, said safety member encounters said operator and is moved from said inoperative position to a position in which said links are under-set for said spring means to bias said safety member to its said operative position to halt said cultivator.

4. A power-operated, walk-type cultivator comprising a prime mover, a clutch, a gear box adapted to provide forward and reverse gear ratios, ground-engaging means for driving said cultivator, said prime mover adapted to drive said ground-engaging means through said clutch and said gear box, a pair of handlebars at the rear of the cultivator for the walking operator, an operating member movable for actuating said clutch, a control supported from one of said handlebars, means interconnecting said operating member and said control, a safety member supported from said one handlebar, operating means interconnecting said safety member and said control, and said safety member adapted to be moved horizontally towards the front of said cultivator from an inoperative position in which it extends transversely between said handlebars in front of the station for the walking operator to an operative position in which said operating means acts on said control to disengage said clutch whereby, when said cultivator is driven with said reverse gear ratio engaged and tends to overtake said operator, said safety member encounters said operator and is moved horizontally forwards to its said operative position to halt said cultivator.

5. A power-operated, walk-type cultivator comprising a prime mover, a clutch, a gear box adapted to provide forward and reverse gear ratios, ground-engaging means for driving said cultivator, said prime mover adapted to drive said ground-engaging means through said clutch and said gear box, an operating member movable for actuating said clutch, a pair of handlebars at the rear of said cultivator for the walking operator, a control supported from one of said handlebars, a cable interconnecting said operating member and said control, a tubular sheath surrounding said cable, a first anchorage fast with said cultivator, the end of said tubular sheath adjacent said operating member held by said first anchorage, a second anchorage, means supporting said second anchorage from said one handlebar for axial movement relatively to said one handlebar, the end of said tubular sheath adjacent said control held by said second anchorage, a safety member supported from said one handlebar, operating means interconnecting said safety member and said second anchorage, and said safety member adapted to be moved horizontally towards the front of said cultivator from an inoperative position in which it extends transversely between said handlebars in front of the station for the walking operator to an operative position in which said operating means acts on said second anchorage to disengage said clutch whereby, when said cultivator is driven with said reverse gear ratio engaged and tends to overtake said operator, said safety member encounters said operator and is moved horizontally forwards to its said operative position to halt said cultivator.

6. A power-operated, walk-type cultivator comprising a prime mover, a clutch, a gear box adapted to provide forward and reverse gear ratios, ground-engaging means for driving said cultivator, said prime mover adapted to drive said ground-engaging means through said clutch and said gear box, an operating member movable for actuating said clutch, a pair of handlebars at the rear of said cultivator for the walking operator, a control supported from one of said handlebars, a cable interconnecting said operating member and said control, a tubular sheath surrounding said cable, a first anchorage fast with said cultivator, the end of said tubular sheath adjacent said operating member held by said first anchorage, a second anchorage, means supporting said second anchorage from said one handlebar for axial movement relatively to said one handlebar, the end of said tubular sheath adjacent said control held by said second anchorage, a safety member supported from said one handlebar, an arm, said safety member fast with said arm intermediate the ends of said arm, a first pivot arranged to support one of said ends of said arm from said one handlebar, a link, a second pivot interconnecting one end of said link and the other end of said arm, a third pivot interconnecting the other end of said link and said second anchorage, said safety member adapted to be moved horizontally towards the front of said cultivator from an inoperative position in which said second and third pivots are over-set relatively to said first pivot and said safety members extends transversely between said handlebars in front of the station for the walking operator to an operative position in which said second and third pivots are under-set relatively to said first pivot and said link acts on said second anchorage to disengage said clutch, and spring means arranged to bias said safety member to said operative position whereby, when said cultivator is driven with said reverse gear ratio engaged and tends to overtake said operator, said safety member encounters said operator and is moved horizontally forwards from said inoperative position to a position in which said links are under-set for said spring means to bias said safety member to its said operative position to halt said cultivator.

References Cited in the file of this patent

UNITED STATES PATENTS

| | | |
|---|---|---|
| 2,263,675 | Crosley | Nov. 25, 1941 |
| 2,725,110 | Weigel | Nov. 29, 1955 |

FOREIGN PATENTS

| | | |
|---|---|---|
| 1,118,023 | Germany | Nov. 23, 1961 |
| 626,078 | Great Britain | July 8, 1949 |